US011873722B2

(12) United States Patent
Ertl et al.

(10) Patent No.: US 11,873,722 B2
(45) Date of Patent: Jan. 16, 2024

(54) LEVER FOR ADJUSTING AN ADJUSTABLE VANE

(71) Applicant: MTU Aero Engines AG, Munich (DE)

(72) Inventors: Franz-Josef Ertl, Munich (DE); Florian Neuberger, Dorfen (DE); David Strunck, Munich (DE); Martin Pernleitner, Dachau (DE); Christian Roth, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/170,926

(22) Filed: Feb. 17, 2023

(65) Prior Publication Data

US 2023/0265765 A1 Aug. 24, 2023

(30) Foreign Application Priority Data

Feb. 18, 2022 (DE) ..................... 10 2022 103 922.6

(51) Int. Cl.

*F01D 17/16* (2006.01)
*F01D 17/12* (2006.01)
*F01D 9/04* (2006.01)

(52) U.S. Cl.

CPC ............... *F01D 17/12* (2013.01); *F01D 9/04* (2013.01); *F05D 2220/323* (2013.01); *F05D 2240/12* (2013.01); *F05D 2260/60* (2013.01)

(58) Field of Classification Search

CPC ...... F01D 17/16; F01D 17/162; F01D 17/165; F01D 17/167; F01D 17/12; F01D 17/14;
(Continued)

(56) References Cited

U.S. PATENT DOCUMENTS 4,295,784 A 10/1981 Manning
4,546,606 A * 10/1985 Bouiller ................ F01D 17/162 60/262

(Continued)

FOREIGN PATENT DOCUMENTS

DE 102015109526 A1 12/2016
DE 102015013182 A1 4/2017

(Continued)

OTHER PUBLICATIONS

Milton, Samuel, "Machining challenges in additive manufacturing", S Innovation forward, Jan. 20, 2020, https://www.sirris.be/machining-challenges-additive-manufacturing.

(Continued)

*Primary Examiner* — Brian P Wolcott
*Assistant Examiner* — Maxime M Adjagbe
(74) *Attorney, Agent, or Firm* — Hinckley, Allen & Snyder, LLP; David R. Josephs

(57) ABSTRACT

The present invention relates to a lever for adjusting an adjustable vane of a turbomachine, wherein the lever has a fulcrum for the rotatable mounting of the lever about an axis of rotation, a first load arm with a first adjusting connection point for at least indirect connection to an adjustable vane and a first force arm with a first actuating connection point for connection to an adjusting device, wherein the lever further has a first strut, which connects the first adjusting connection point and the first actuating connection point to each other and thereby extends in an arc-shaped manner about the axis of rotation.

19 Claims, 4 Drawing Sheets

(58) Field of Classification Search
CPC ............... F02C 7/042; F05D 2220/323; F05D 2240/12; F05D 2250/90
See application file for complete search history.

(56) References Cited

U.S. PATENT DOCUMENTS

| | | | | |
|---|---|---|---|---|
| 5,692,879 | A | 12/1997 | Charbonnel | |
| 2006/0260307 | A1* | 11/2006 | Bouru | F01D 17/162 60/602 |
| 2006/0263206 | A1* | 11/2006 | Bouru | F01D 17/162 415/159 |
| 2010/0080684 | A1 | 4/2010 | Colotte et al. | |
| 2011/0182716 | A1* | 7/2011 | Bouru | F04D 27/023 415/148 |
| 2016/0069275 | A1* | 3/2016 | Lecordix | F02C 9/22 415/146 |
| 2018/0010478 | A1 | 1/2018 | Dumas et al. | |
| 2018/0030849 | A1* | 2/2018 | Bordoni | F01D 17/162 |
| 2018/0258951 | A1* | 9/2018 | Theux | F04D 29/563 |

FOREIGN PATENT DOCUMENTS

| | | | |
|---|---|---|---|
| FR | 3076325 | A1 | 7/2019 |
| SU | 775405 | A1 | 10/1980 |

OTHER PUBLICATIONS

Westcam Datentechnik GmbH, “Component optimization—get more out of your component”, 3D printing and simulation, https:..www.westcam.at/dienstleistungen/3d-printing/bauteiloptimierung/; 2021; Accessed: Jan. 18, 2023.

Deppe, Gereon, “lightweight construction—Fast to the optimized lightweight design”, May 6, 2020, https://www.konstruktionspraxis.vogel.de/schnell-zum-optimierten-leichtbaudesign-a-929509.

* cited by examiner

LEVER FOR ADJUSTING AN ADJUSTABLE VANE

BACKGROUND OF THE INVENTION

The present invention relates to a lever for adjusting an adjustable vane of a turbomachine.

The turbomachine can involve, for example, a jet engine, such as, for example, a turbofan engine. Functionally, the turbomachine is divided into compressor, combustion chamber, and turbine. In the case of the jet engine, for instance, air intake is compressed by the compressor and undergoes combustion with admixed kerosene in the downstream combustion chamber. The hot gas that is formed, a mixture of combustion gas and air, flows through the downstream turbine and is thereby expanded. As a rule, both the compressor and the turbine are constructed from a plurality of stages, each of which has a stator (guide vane ring) and a rotor (rotating blade ring).

Vane rings with adjustable vanes can find application in the turbine and, in particular, in the compressor. An adjustment assembly for adjusting the adjustable vanes can comprise an adjustment ring, which can rotate a bit around the longitudinal axis of the turbomachine, with this rotational displacement then being transmitted to the individual adjustable vanes of the vane ring. Furthermore, the adjustment assembly can also comprise a coupling rod, which is axially offset for producing the rotational displacement of the adjustment ring and with which, as part of a transmission mechanism, for example, the adjustable vanes of different stages are simultaneously actuated.

Between the coupling rod and the adjustment ring, it is thereby possible to arrange a lever as presently under discussion, on the force arm of which an actuating connection point is connected to the coupling rod and on the load arm of which an adjusting connection point is connected at least indirectly to the adjustable vane. In detail, it is possible to mount a push rod, for example, on the adjusting connection point, said push rod transmitting the displacement of the lever onto the adjustment ring (from there, a further mechanism can then provide coupling to the individual adjustable vanes).

SUMMARY OF THE INVENTION

The present invention is based on the technical problem of specifying an advantageous lever for adjusting an adjustable vane of a turbomachine.

In accordance with the invention, this problem is solved with the lever according to the present invention. In this lever, the adjusting connection point and the actuating connection point are each connected not only by way of the load arm and the force arm to the fulcrum of the lever, but, in addition, a strut is provided. This strut connects the adjusting connection point and the actuating connection point directly to each other and in this way extends in an arc-shaped manner around the axis of rotation of the lever. If, during operation, in order to adjust the adjustable vanes by way of the lever, a displacement is transmitted with respect to the longitudinal axis of the turbomachine, that is, for example, an axial displacement of the adjusting device/coupling rod is converted to a circumferential displacement of the push rod/the adjustment ring, then the lever is thereby rotated a bit around its axis of rotation. In this way, the arc-shaped strut creates stability, with the transmission of force occurring not only by way of the load arm and the force arm, but also by way of the arc-shaped strut.

In pictorial terms, the arc-shaped strut pushes or pulls the adjusting connection point, with the strut preferably being subject to essentially only normal forces. Therefore, predominantly or else exclusively, only normal forces arise in the strut, that is, a torque or sheer load is at least reduced. In comparison, if the lever were constituted without the arc-shaped strut and all forces were transmitted by way of the load arm and the force arm, it would be possible for high forces or torques to arise in the arms, for example, and, in particular, at the respective transition into the fulcrum. The arc-shaped strut can prevent this, so that, viewed overall and in spite of the additional strut, the lever can be produced with reduced material thicknesses at other points and hence, in comparison, can be produced to be lighter in weight, for example. This can also be of advantage in aircraft engines, for instance, in regard to fuel consumption. In that the introduction or transmission of force does not occur by the shortest path, it is possible to reduce the mechanical load. This can also increase the service life, for example.

Preferred embodiments are found in the dependent claims and in the entire disclosure, whereby, in the description of the features, a distinction is not always made individually between apparatus aspects and method or use aspects; in any case, the disclosure is to be read implicitly in terms of all claim categories. Furthermore, the disclosure is always to be read in terms of both the lever and an adjustment assembly or a module for a turbomachine with such an adjustment assembly.

In the course of the description of the lever, specifications such as "axially," "radially," and "circumferentially" or "in an arc-shaped manner" refer to the axis of rotation of the lever, around which the lever will be or is mounted rotatably and, during operation, is rotated for adjusting the adjustable vanes. As will become clear below in detail, the lever can be constructed in a plurality of axially offset planes, with the various planes of construction being differentiated by "first" and "second" and also the individual features within a respective plane being correspondingly referenced (first load arm, first force arm, first arc-shaped strut, etc.). In particular, this relates to the claims; in the description, the features are also generically referenced (load arm, force arm, arc-shaped strut, etc.).

In general, in the scope of the present disclosure, "a" and "an" are to be read as indefinite articles and, unless explicitly stated otherwise, are always to be read as "at least one"; overall, therefore, the lever can also have, for example, a plurality of arc-shaped struts (for example, a first strut and a second strut; compare also the exemplary embodiment for illustration).

As mentioned above, the strutted design makes possible an overall weight-reduced construction. In general, the lever is produced, for example, from a metal material, such as, for example, from titanium or from an alloy containing titanium. In general, the lever can thereby also be produced in a casting method; that is, it can involve a cast part. In particular, in the case of a complex strutted geometry, however, it is also possible for an additive manufacturing (AM) method to occur, such as, for instance, in a powder-bed method; that is, the lever can also be an additively fabricated part.

The arc-shaped strut extends in the circumferential direction around the axis of rotation of the lever, preferably in the form of a circular arc. In this case, the center angle of this arc shape or circular arc shape can amount to, for example, at least 15°, 25°, or 30° (possible upper limits can lie at, for example, at most 165°, 155°, or 145°), whereby these details also can depend on the exact site of use (which stage, etc.).

In accordance with a preferred embodiment, the arc-shaped strut extends tangentially, as viewed in the axial direction, into the adjusting connection point. If, for example, a push rod is mounted there, then this push rod, as viewed axially, is preferably tangential to the arc-shaped strut, thereby allowing a good force coupling. In a preferred embodiment, alternatively or preferably additionally, the arc-shaped strut extends tangentially into the actuating connection point; in general, the tangential in-coupling can be of advantage, for example, in regard to the initially mentioned normal force load.

In accordance with a preferred embodiment, the lever has, in addition, a cross strut, which connects the fulcrum to the arc-shaped strut. In general, the cross strut can extend at an angle to the arc-shaped strut, that is, at an angle of less than 90° to a tangent placed at the arc-shaped strut. Preferably, however, it extends parallel to the radial direction in the arc-shaped strut; that is, it is perpendicular to said tangent. During operation, the cross strut is also preferably subject to a normal force; that is, in any case, it must not accommodate any substantial torque.

In a preferred embodiment, the cross strut is arranged on a central position of rotation between the connection points. In general, there can also be a plurality of cross struts, even within the same plane; however, especially preferably, there is per plane exactly one cross strut, which, furthermore, is arranged centrally.

In accordance with a preferred embodiment, the load arm and the force arm span a plane; that is, the first load arm and the first force arm together span a first plane. Preferably, the first arc-shaped strut also lies in the first plane; that is, it does not extend at an angle or is inclined to the first plane.

In accordance with a preferred embodiment, the lever has a second load arm, which is axially offset with respect to the first load arm, and, furthermore, the lever has a second force arm, which is axially offset with respect to the first force arm. Preferably, the load arm and the force arm can be arranged with respect to each other along the axis of rotation, each in a translationally symmetrical manner. Preferably, the lever further has a second arc-shaped strut, which connects a second adjusting connection point of the second load arm to a second actuating connection point of the second force arm (and is preferably translationally symmetrical to the first arc-shaped strut).

In a preferred embodiment, the second load arm and force arm also together span a (second) plane, in which preferably also the second arc-shaped strut lies. The first plane and the second plane are axially offset; preferably, they lie parallel to each other and more preferably here, perpendicular to the axis of rotation in each instance.

Provided in a preferred embodiment is a connecting strut, which connects the arc-shaped struts of the first and second planes to each other. The connecting strut can extend, for example, at an angle to the arc-shaped strut in each instance, that is, at an angle of less than 90° with respect to each of the planes. Preferably, a first connecting strut and a second connecting strut are provided and cross each other, for example, at the axial center between the arc-shaped struts and/or at a central position of rotation.

The invention also relates to an adjustment assembly, which, in addition to the lever, has an adjusting device with a coupling rod, which is mounted at the actuating connection point or at the actuating connection points. By way of the coupling rod, for example, an axial displacement with respect to the longitudinal axis of the turbomachine is transmitted, in consequence of which the lever rotates around its axis of rotation. This rotational displacement is transmitted to the adjusting vane by way of a push rod, which is mounted at the adjusting connection point, by way of an intervening adjustment ring, for example.

The coupling rod can be actuated, for example, by use of an actuator, in particular a linear actuator. In this way, the coupling rod can extend over a plurality of stages; that is, it can couple to the adjustable vanes of different stages. It is thereby possible to provide for each stage an above-described lever, which converts the displacement of the coupling rod to a rotational displacement. Preferably, it is then possible to design a plurality of levers or all levers in accordance with the invention, that is, with an arc-shaped strut, etc.

As discussed above, the arc-shaped strut(s) in the adjustment assembly is or are preferably subject to a normal force and, more preferably, this also holds true, for example, for the cross strut or cross struts. As a result of the strutting, it is possible, for example, for the load arm and the force arm, which, unlike in a reference case without arc-shaped struts, to be essentially subject to a normal force, that is, in any case, not to be subject to larger torques. As a result of the "normal force load," predominantly or even exclusively normal forces arise; any damaging mechanisms are then driven by normal forces, for example, and not by torques.

The invention also relates to a turbine module or, in particular, a compressor module having such an adjustment assembly and with an adjustable vane, in particular, a plurality of adjustable vanes combined into a ring. In general, the adjustable vane is or will be preferably a guide vane; that is, it is arranged in a guide vane ring (stator).

Furthermore, the invention relates to the use of a presently disclosed lever for a turbomachine, in particular a jet engine. During operation, the lever is rotated around its axis of rotation and, in consequence thereof, adjustable vanes are displaced.

BRIEF DESCRIPTION OF THE DRAWINGS

The invention is explained below in detail on the basis of an exemplary embodiment, whereby, in the scope of the dependent claims, the individual features also can be essential to the invention in other combinations and also, furthermore, no distinction is made in detail between the different claim categories.

Taken individually.

DESCRIPTION OF THE INVENTION

Figure 1:
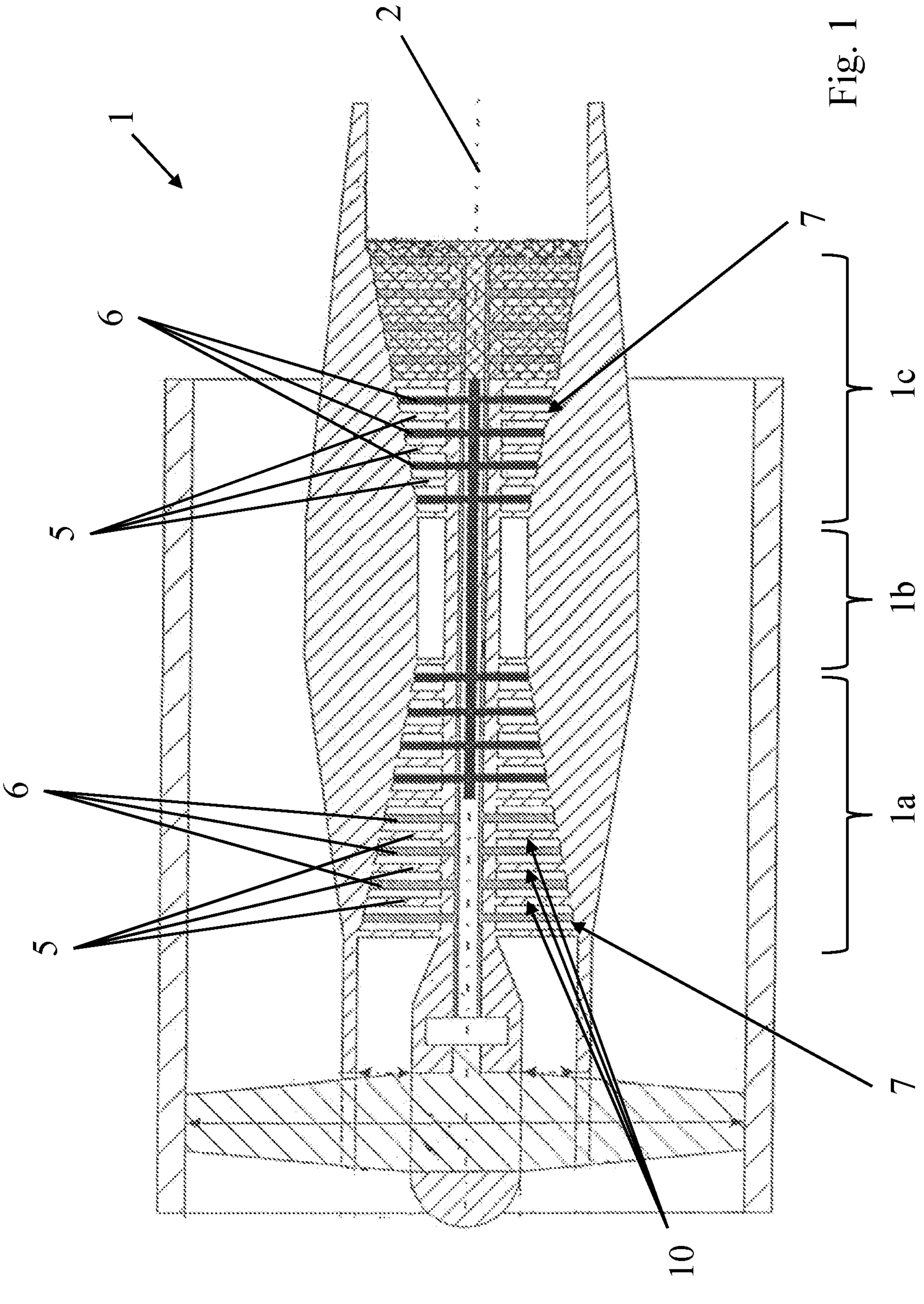
FIG. 1 shows a turbomachine in an axial section.

FIG. 1 shows a turbomachine 1, specifically a turbofan engine, in a longitudinal section. Functionally, the turbomachine 1 is divided into a compressor 1*a*, a combustion chamber 1*b*, and a turbine 1*c*. Both the compressor 1*a* and the turbine 1*c* are each constructed from a plurality of stages. Each of the stages is composed of a guide vane ring 5 and a rotating blade ring 6. The reference number 7 refers to the gas duct, that is, the compressor gas duct in the case of the compressor 1*a* or the hot gas duct in the case of the turbine 1*c*. In the compressor gas duct, the air intake is compressed and then undergoes combustion with admixed kerosene in the combustion chamber 1*b*. The resulting hot gas flows through the hot gas duct and thereby drives the rotating blade rings 6 of the turbine 1*c*.

In the present example, a plurality of guide vane rings 5 of the compressor 1*a* are equipped with adjustable vanes 10, which can be adjusted in order to adapt the angle of attack.

Figure 2:
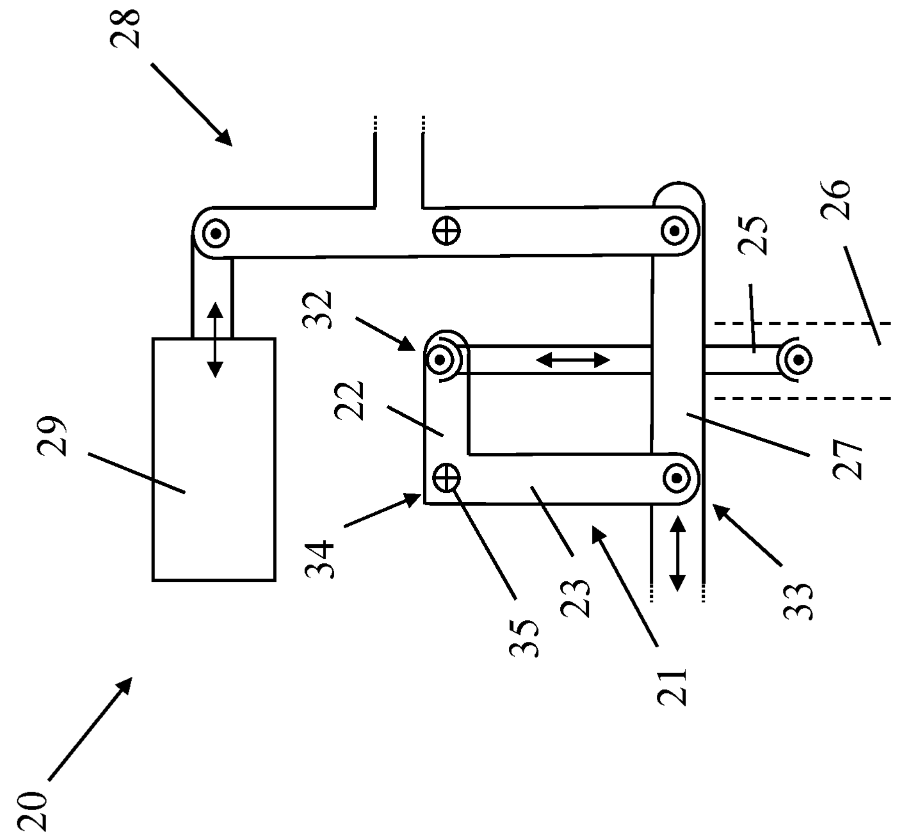
FIG. 2 shows an adjustment assembly for adjusting adjustable vanes in an overview depiction.

FIG. 2 shows an adjustment assembly 20, which is provided for this purpose and which, among other things, has a lever 21. A load arm 22 of the lever 21 is coupled in an adjusting connection point 32 to the adjustable vanes of the respective stage, namely, by way of a push rod 25, which converts a displacement of the lever 21 to a rotational displacement of an adjustment ring 26. The adjustment ring 26 extends circumferentially around the longitudinal axis of the turbomachine 2 (not depicted in detail here) and then transmits the displacement onto each individual adjustable vane of the respective ring.

The displacement is transmitted onto the lever 21 by use of a coupling rod 27, which is part of an adjusting device 28 with an actuator 29. The coupling rod 27 couples to a force arm 23 of the lever 21 and is mounted there on an actuating connection point 33. At a fulcrum 34, the lever 21 is mounted rotatably around an axis of rotation 35.

Figure 3:
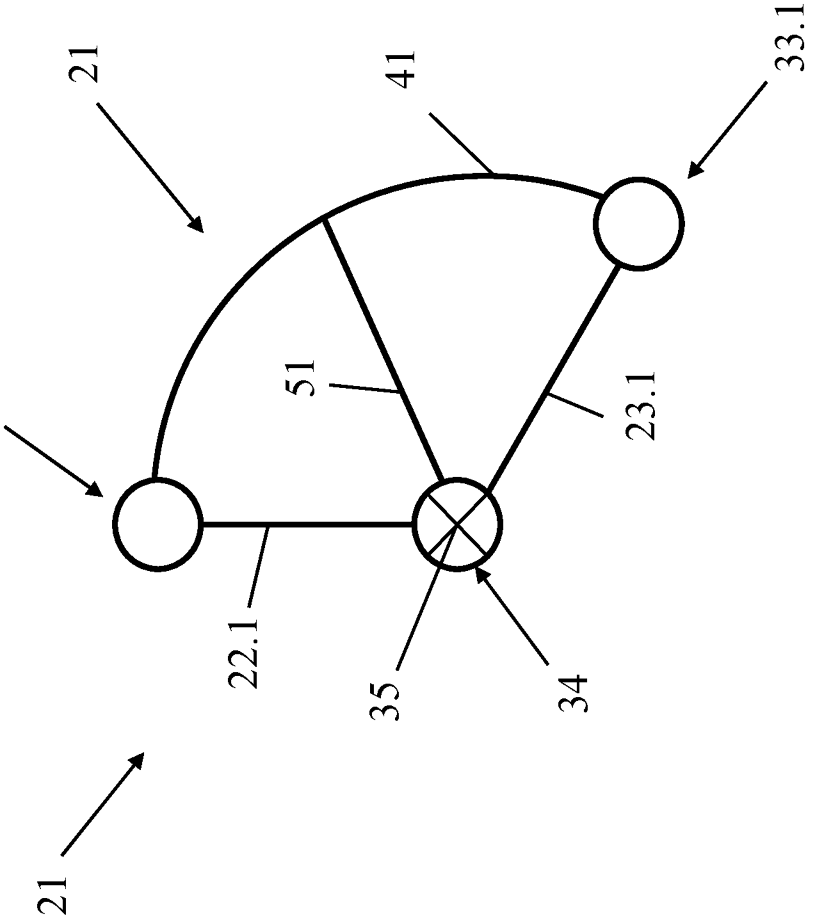
FIG. 3 shows a lever according to the invention for the adjustment assembly in accordance with FIG. 2 in a plan view.

FIG. 3 shows a lever according to the invention 21 in a plan view, namely, as viewed axially with respect to the axis of rotation 35. To be seen, furthermore, is a first force arm 23.1 with a first actuating connection point 33.1 as well as a first load arm 22.1 with a first adjusting connection point 32.1. The push rod is mounted at the latter, but is not depicted for reasons of clarity. In addition, in this case, the connection points 32.1, 33.1 are connected to each other by way of a first strut 41, which extends in an arc-shaped manner around the axis of rotation 35 and extends tangentially into the connection points 32.1, 33.1. The arc-shaped first strut 41 reduces the torque; essentially only normal forces are introduced or further transmitted. Overall, this is of advantage in regard to the level of mechanical stress, for which reason the lever 21 can be designed in a weight-reduced manner—compare the introductory description for details.

In the plan view, furthermore, a first cross strut 51 is to be seen, which connects the fulcrum 34 to the first arc-shaped strut 41 and hereby is situated radially. The first cross strut 51 supports the first arc-shaped strut 41 more or less, whereby it is likewise subject essentially only to normal forces.

Figure 5:
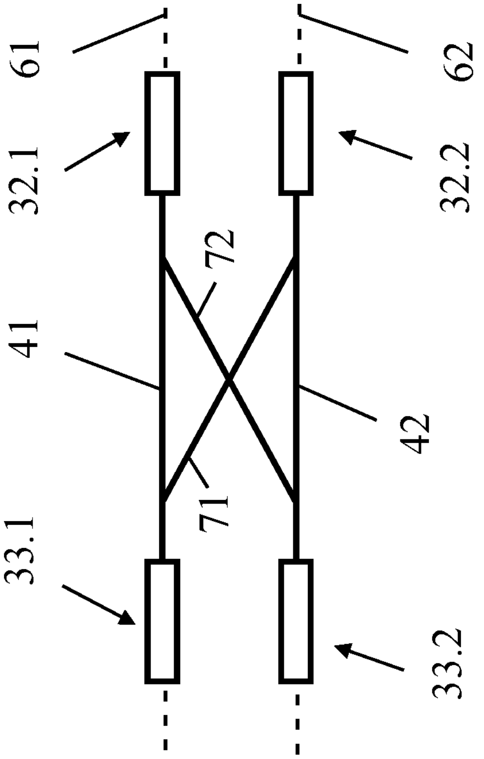
FIG. 5 shows the lever in accordance with FIGS. 3 and 4 in a side view.
Figure 4:
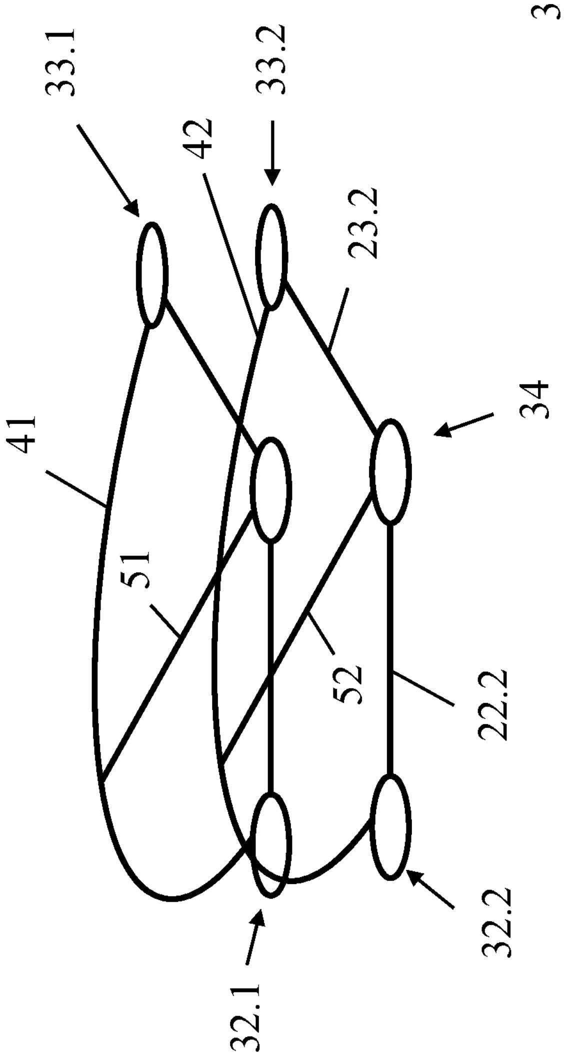
FIG. 4 shows the lever in accordance with FIG. 3 in an oblique view.

FIG. 4 shows the lever 21 in an oblique view, with the components described on the basis of FIG. 3 lying in a first plane 61 (plane shown in FIG. 5). Axially offset with respect to said plane is a second plane 62 (compare likewise FIG. 5), in which a second load arm 22.2 with a second adjusting connection point 32.2 and a second force arm 23.2 with a second actuating connection point 33.2 are arranged. Furthermore, there is a second arc-shaped strut 42, which connects the second connection points 32.2, 33.2 to each other. The second arc-shaped strut 42 is connected here to the fulcrum 34 by way of a second cross strut 52.

FIG. 5 shows the lever 21 in a side view, as viewed radially with respect to the axis of rotation 35. To be seen are the first and second arc-shaped struts 41, 42, as well as the respective planes 61, 62. To be seen, furthermore, are first and second connecting struts 71, 72 (not shown in FIG. 4 for reason of clarity), each of which connects the first and second arc-shaped struts 41, 42 to each other. The connecting struts 71, 72 cross axially and also centrally with respect to a position of rotation.

What is claimed is:

1. A lever for adjusting an adjustable vane of a turbomachine, comprising:

a lever having a fulcrum for a rotatable mounting of the lever around an axis of rotation, a first load arm with a first adjusting connection point for at least indirect connection to the adjustable vane, and a first force arm with a first actuating connection point for connection to an adjusting device, wherein the lever further has a first strut, which connects the first adjusting connection point and the first actuating connection point to each other and thereby extends in an arc-shaped manner around the axis of rotation.

2. The lever according to claim 1, wherein the first arc-shaped strut, as viewed in an axial direction with respect to the axis of rotation, extends tangentially into the first adjusting connection point.

3. The lever according to claim 1, wherein the first arc-shaped strut, as viewed in an axial direction with respect to the axis of rotation, extends tangentially into the first actuating connection point.

4. The lever according to claim 1, further comprising a first cross strut, which connects the fulcrum and the first arc-shaped strut to each other.

5. The lever according to claim 4, wherein, with respect to the axis of rotation, the first cross strut extends radially into the first arc-shaped strut.

6. The lever according to claim 4, wherein the first cross strut lies between the first adjusting connection point and the first actuating connection point on a central position of rotation with respect to the axis of rotation.

7. The lever according to claim 1, wherein the first load arm and the first force arm lie in a first plane.

8. The lever according to claim 1, further comprising:

a second load arm with a second adjusting connection point for at least indirect connection to the adjustable vane, a second force arm with a second actuating connection point for connection to the adjusting device, and a second strut, which extends in an arc-shaped manner around the axis of rotation and connects the second adjusting connection point and the second actuating connection point to each other.

9. The lever according to claim 8, wherein the second load arm and the second force arm lie in a second plane, which is axially offset with respect to the axis of rotation and lies parallel to the first plane.

10. The lever according to claim 8, further comprising a first connecting strut, which connects the first and second arc-shaped struts to each other.

11. The lever according to claim 10, further comprising a second connecting strut, which connects the first and second arc-shaped struts to each other and crosses the first connecting strut.

12. An adjustment assembly for adjusting an adjustable vane of a turbomachine, comprising:

a lever according to claim 1, a push rod, which is mounted at the first adjusting connection point, and a coupling rod, which is mounted at the first actuating connection point, wherein a displacement of the coupling rod by way of the lever is converted to a displacement of the push rod, and the displacement of the push rod is converted to an adjustment of the adjustable vane.

13. The adjustment assembly according to claim 12, wherein the first arc-shaped strut is exclusively subject to normal force.

14. A compressor or turbine module having the adjustment assembly according to claim 12 and the adjustable vane.

15. A jet engine comprising the lever according to claim 1.

16. The lever according to claim 5, wherein the first cross strut lies between the first adjusting connection point and the first actuating connection point on a central position of rotation with respect to the axis of rotation.

17. The lever according to claim 9, further comprising a first connecting strut, which connects the first and second arc-shaped struts to each other.

18. The lever according to claim 17, further comprising a second connecting strut, which connects the first and second arc-shaped struts to each other and crosses the first connecting strut.

19. A compressor or turbine module having the adjustment assembly according to claim 13 and the adjustable vane.

* * * * *